United States Patent [19]
Rood et al.

[11] Patent Number: 5,601,052
[45] Date of Patent: Feb. 11, 1997

[54] LITTER BOX ASSEMBLY

[75] Inventors: John W. Rood, 15120 E. Greene Valley Rd., Fountain Hills, Ariz. 85268; John D. Rood, Fountain Hills, Ariz.

[73] Assignee: John W. Rood, Fountain Hills, Ariz.

[21] Appl. No.: 408,149

[22] Filed: Mar. 20, 1995

[51] Int. Cl.⁶ ................................ A01K 1/035
[52] U.S. Cl. .................................... 119/166
[58] Field of Search ................ 119/165, 166, 119/167; 209/370, 373, 374, 707, 614

[56] References Cited

U.S. PATENT DOCUMENTS

| | | | |
|---|---|---|---|
| 4,117,804 | 10/1978 | Moore et al. | 119/166 |
| 4,522,150 | 6/1985 | Gershman | 119/166 |
| 4,667,622 | 5/1987 | Breault | 119/165 |
| 4,854,267 | 8/1989 | Morrow | 119/166 |
| 4,886,014 | 12/1989 | Sheriff | 119/166 |
| 5,178,099 | 1/1993 | Lapps et al. | 119/166 |
| 5,272,999 | 12/1993 | Nussle | 119/166 |
| 5,402,751 | 4/1995 | De La Chevrotiere | 119/166 |
| 5,463,982 | 11/1995 | Murphy | 119/166 |

Primary Examiner—Todd E. Manahan
Attorney, Agent, or Firm—Richard R. Mybeck; Peter B. Scull

[57] ABSTRACT

A litter box assembly comprising an open base portion having a litter holding wing portion extending upwardly therefrom and operatively associated therewith and a removable sifting device disposed therein beneath a layer of loose litter material disposed thereupon. The sifting device is removable from the base portion to remove clumped and fecal matter therefrom while permitting loose litter material to pass therethrough. The assembly is readily restored to a clean and ready for use condition by rotating the assembly onto the first and second wall portions of the wing portion whereupon in response to gravitational forces, the loose granular litter material flows into the wing portion and the sifting device is placed in the bottom of the base portion which is then recovered with the loose granular material by rotating the assembly from its position on the wall portions of the wing portion to an at-rest position on said base portion.

10 Claims, 2 Drawing Sheets

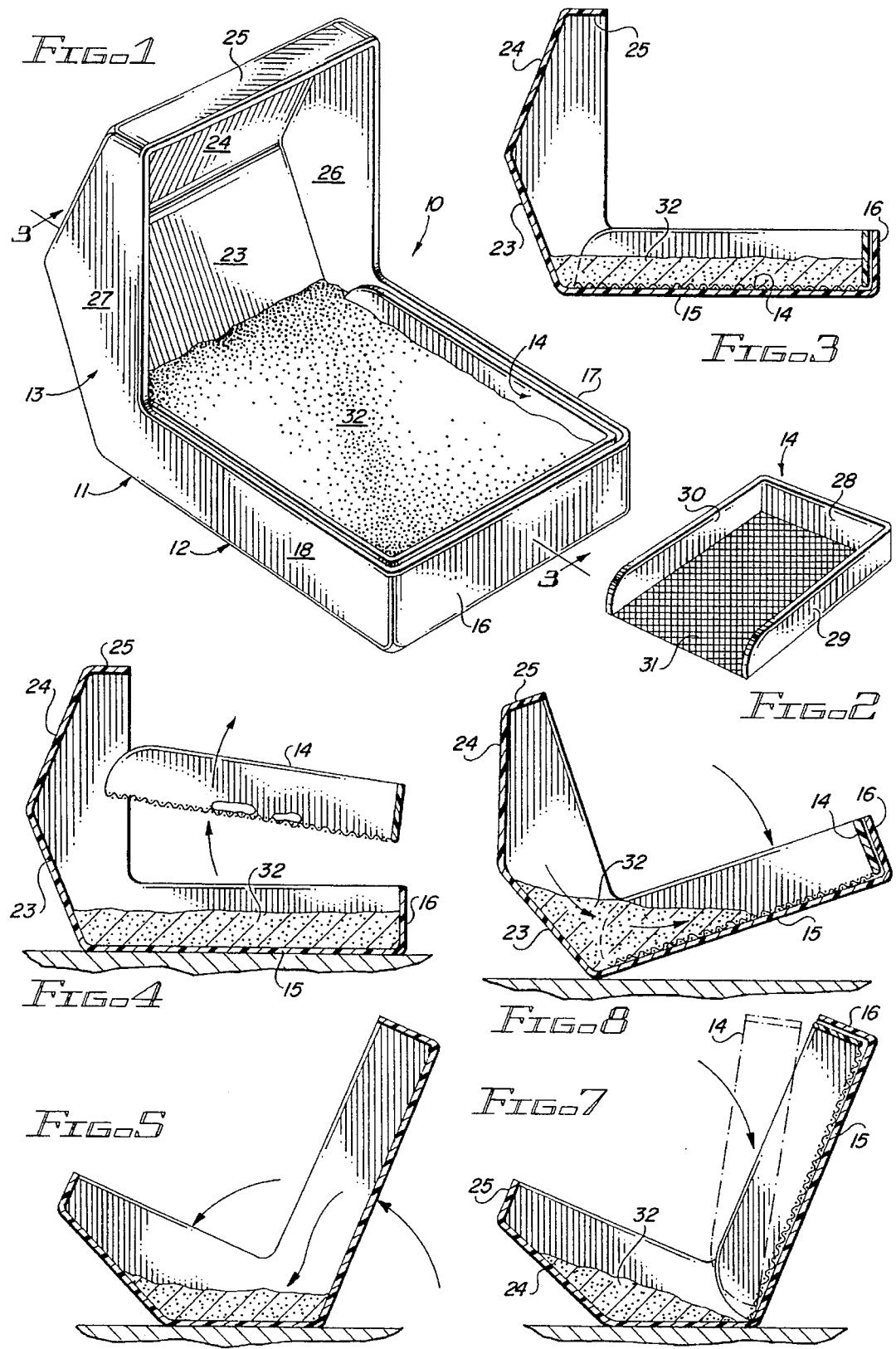

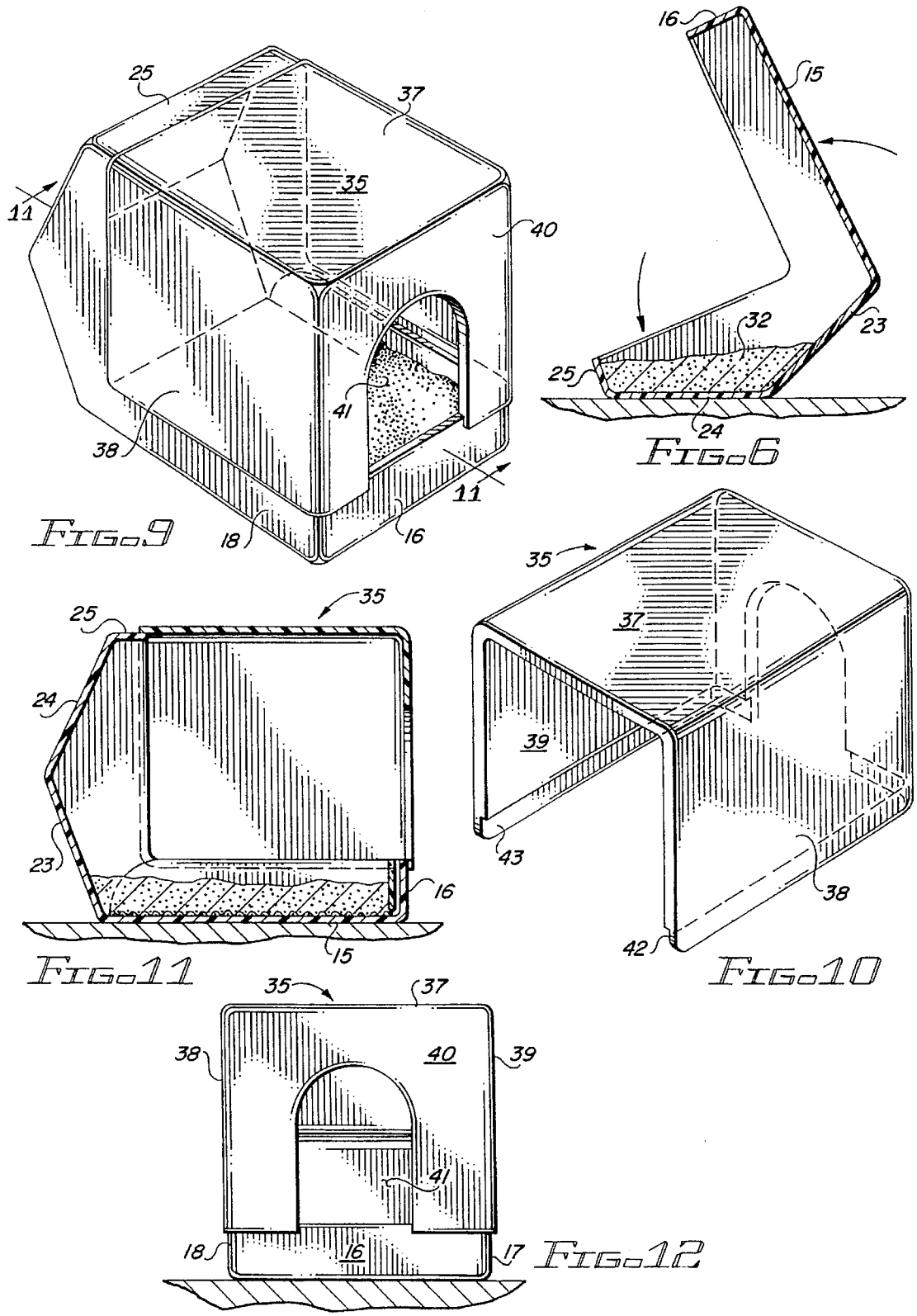

LITTER BOX ASSEMBLY

INTRODUCTION

This invention relates generally to a litter box and, more particularly, to a litter box assemblage from which solid pet excrement, including fecal matter and clumped absorbent litter, can be easily and efficiently removed to leave only clean absorbent granular litter material in the box for future use.

BACKGROUND OF THE INVENTION

Pet litter boxes, particularly those used for cats and small animals, typically utilize a tray-like structure to provide a reservoir of granular, absorbent litter material for animal access. The traditional method of disposing of the accumulated urine and fecal matter has been to discard the entire contents of the litter box, including unpolluted absorbent litter material.

More recently, however, environmental and economic concerns have lead to the development of quasi-reusable litter material. Thus, when the pet relieves itself, a popular absorbent granular litter material coagulates and forms clumps as urine and other liquid wastes are deposited within the box. These clumps and any fecal matter are then removed by means of an auxiliary sifting device which separates the coagulated/clumped material from the clean litter material which remains in the tray for reuse. Thus, while the art has addressed the selective disposal of contaminated granular absorbent litter material with some success, many residual problems still exist as will be hereinafter discussed.

There are a number of prior patents relating to the disposal of litter from house pets. Among these are U.S. Pat. No. 3,752,120, Pallesi, which issued on Aug. 14, 1973 and teaches a cat litter box comprising a series of three nesting containers, one of which has a foraminous screen-like bottom and two of which have solid bottoms. The user removes the inner, foraminous bottomed container and disposes of the refuse. Then, the user takes the top box containing the gravel and lifts it out of the third box. The screened container is then nested within the empty third box and the gravel is poured into that box over the screen. Finally, the third box containing the gravel, and the screen-like container, are nested within the now empty top box.

U.S. Pat. No. 4,096,827, Cotter, issued Jun. 27, 1978 and teaches a self-cleaning cat waste disposal device. The device comprises a suitcase type structure with substantially identical compartments pivotally connected along one edge and latchable together by a three way handle along an opposite edge thereof. A pivotally mounted screen unit is included between the container compartments and latchable to one or the other by the handle structure. The litter is located in one half and the box is open with the screen latched to the box top. When the cat owner chooses to sift the litter, the box is closed and turned upside down so that the litter falls through the screen and into the opposite compartment while the waste is retained on the screen. The top compartment is then opened, the screen with the refuse is removed and the refuse is discarded. The screen may then be replaced and latched to the structure in superposition to the clean litter.

U.S. Pat. No. 4,190,525, Menzel, issued Feb. 26, 1980 and teaches a litter and refuse receptacle and separator. The device comprises a receptacle and a sifting screen which is detachably mounted to a crank system which allows the user to turn the handle and rotate the screen through the litter and pick up the refuse therefrom. Alternatively, the receptacle is provided with vertically extending slots adjacent the middle of the receptacle to receive a screen therein. With the screen thus placed in the box, the litter is separated from the refuse by raising one end of the box to cause the litter to fall through the screen while catching the refuse thereupon. The screen is then removed and the accumulated refuse discarded. The screen is then reinserted into the box and the box is tipped the other direction so the litter on that side of the screen is passed through the screen to remove refuse therefrom. The screen is then removed and the litter is shifted for further use. A last embodiment in Menzel comprises a box with a screen on the bottom. The screen has handles extending upward. The screen is simply lifted up to remove the refuse and then is pushed back down into the sand.

Finally, U.S. Pat. No. 4,802,442, Wilson, issued Feb. 7, 1989 and teaches a cat litter screening device. This device includes two planar bottom panels of a mesh material whose openings are sized to pass the litter but not the waste. The bottom panels are pivoted together along a central axis and lift means are attached to the sides for moving the panels up and down through the litter. The lift means include handles and side panels which are also of mesh material. In one embodiment the handles are rigid. In another embodiment lock means are provided by which the handles can be moved to a first position down and away from the sides of the litter box and to a second position where they are locked for applying force to move the bottom panels up and down through the litter.

The basic premise of all of these devices, the separation of waste from litter for discarding the waste therefrom, has been employed in various ways through the years with varied degrees of success. All of the devices appear to fall into three main categories, i.e., (a) the nested screening litter box where one box is nested within at least one other box; (b) the double box system having a screen removably placed over one box and where the entire system is inverted to filter the litter; and (c) the sifting device mounted on the bottom under the litter. The present invention relates to category (c) and has been developed to overcome the lingering problem of replacing the screen into the assembly after the waste material has been removed and discarded whereas most of the prior art devices required great exertion to shake the box and soiled litter and frequently involved a soiled sifting device requiring off-site storage until later retrieved to dispose of the then accumulated waste.

The present invention is clearly an improvement over the prior art because it overcomes all of the aforesaid problems as well as eliminates the need for the human caretaker to maintain his/her face in close proximity to the box for an extended period of time while separating the waste from the litter. It further substantially avoids the possibility of scattering both waste and litter material to the surroundings when the screen is drawn up through the litter material to separate the waste therefrom.

BRIEF SUMMARY OF THE INVENTION

The present invention relates to a litter box assembly and more particularly to a new and improved litter box assembly in which a discrete sifting device is strategically mounted within a litter box housing for use when needed to remove clumped urine and fecal matter from the particulate litter material. The present invention further includes means for diverting uncontaminated litter material out of the way while reinstalling the sifting device, now rid of its accumulated waste, into the housing and thereafter quickly and neatly returning the diverted litter material back into an operative position in juxtaposition to the now reburied sifting device.

Accordingly, the principal object of the present invention is to provide a new and unique litter box assembly which embodies a unique coaction between a screen member sifting device, the litter and the box so that the pet owner does not have the problem of storing the soiled screening device outside the box where it can be handled by inquisitive toddlers and the like and which enables the screen member to be readily returned to its operative position and covered in a simple fashion.

It is a further object of the present invention to provide a novel and unique litter box assembly which is inexpensive to manufacture and which is adaptable for a number of different sized house pets.

A still further object of the present invention is to provide a novel and unique litter box assembly in which a self-contained screening device is operable to move through contaminated litter to remove the contaminants therefrom and thereafter, by simple movement of the housing allows the litter to be moved to a controlled site away from the screen bed while the screen is reseated therein and then, by additional strategic movement of the housing, permits the litter to be readily and uniformly deployed in superposition over the screen for reuse.

These and still further objects as shall hereinafter appear are fulfilled by the present invention in a remarkably unexpected fashion as will be readily discerned from the following detailed description of an exemplary embodiment thereof particularly when read in conjunction with the accompanying drawings in which like parts bear like numerals throughout the several views.

BRIEF DESCRIPTION OF THE DRAWING

In the drawing:

FIG. 1 is an isometric view of a litter box assembly embodying the present invention;

FIG. 2 is an isometric view of a screen member embodying the present invention;

FIG. 3 is a cross-sectional view of the litter box assembly taken on line 3—3 of FIG. 1;

FIG. 4 is an exploded view of the litter box assembly of FIG. 3 seated on its base and showing the sifting device being removed therefrom;

FIG. 5 is a side elevation of the litter box assembly of FIG. 4 seated on the first end wall of the wing portion and shows the movement of the litter material from a first to a second position;

FIG. 6 is a side elevation of the litter box assembly of FIG. 4 seated on a second end wall of the wing portion and shows the movement of the litter material from a second to a third position;

FIG. 7 is a side elevation of the litter box assembly of FIG. 4 returned to a seated position on the first end wall of the wing portion and shows the litter retained in its out-of-the-way site while the screen member is reseated in the base portion;

FIG. 8 is a side elevation of the litter box assembly of FIG. 4 showing the assembly being returned to its "ready for use" position;

FIG. 9 is an isometric view of a litter box assembly on which is operatively placed an optional hood structure;

FIG. 10 is an isometric, rear view of the hood structure of FIG. 9;

FIG. 11 is a cross-sectional view of the litter box assembly and hood structure of FIG. 9 taken on line 11—11 thereof; and FIG. 12 is a front elevation of the litter box assembly and hood structure of FIG. 9.

DESCRIPTION OF THE PREFERRED EMBODIMENT

Referring now to the drawings, and particularly FIGS. 1 and 9, a litter box assembly embodying the present invention is identified by the general reference 10. Litter box assembly 10 comprises a housing 11 having a base portion 12 and a litter holding wing portion 13. A sifting device 14 is operably disposed within base portion 12 in a manner to be hereinafter more fully described.

In a preferred embodiment of the present invention, base portion 12 comprises a substantially rectangular, upwardly open box-like structure having a substantially rectangular bottom member 15, an end wall 16 disposed in generally perpendicular relationship to bottom member 15 at the proximal end thereof, and first and second generally rectangular side walls 17, 18 disposed in spaced generally parallel relationship to each other and operatively associated with and extending between end wall 16 and wing portion 13. Wing portion 13 extends upwardly from the distal end of base portion 12 and includes a first angularly disposed or slanted wall portion 23, a second slanted wall portion 24, a roof or containment member 25, and first and second pentagonal side walls 26, Pentagonal side walls 26, 27 are disposed in spaced generally parallel relationship to each other and are coplanar with and attached to side walls 17, 18 of bottom member 15. Walls 26, 27 are also integrally connected to end walls 23, 24, roof member 25 and base portion 12. First slanted end wall portion 23 extends from the base portion 12 and defines therewith a first included interior angle of approximately 120°. Second slanted end wall portion 24 extends from first end wall portion 23 and defines therewith a second included interior angle of approximately 120°. Roof member 25 extends from the second slanted side wall portion 24 and defines therewith a third included interior angle of approximately 120° so that roof member 25 is disposed in generally parallel spaced relationship to base portion 12. Note that while three angles of 120° each are preferred, a plurality of diverse, unequal angles may be employed to achieve a substantially similar device.

As shown, assembly 10 is constructed so that when the entire unit is rotated to seat upon end portion 23 or upon end portion 24 (as shown in FIG. 6), granulated litter material 32 migrates into wing portion 13 which defines a storage site for the litter material in a manner and for a purpose to be hereinafter described in detail.

Construction of the assembly embodying the present invention can be from any desired material, such as wood, cardboard, plastic, metal or any other conventional material which possesses sufficient strength to maintain its shape during use. Assembly 10 can be constructed in integral pieces and assembled in the manner described above, or it can be molded as a single unit using conventional injection molding or casting equipment. The preferred embodiment is made from an injection molded plastic of a type well known to those in the art.

Sifting device 14 is likewise generally constructed of the same or similar materials as the housing and, as shown in FIGS. 2 and 4, includes an open-ended, generally rectangular, unit having an end wall 28, first and second side walls 29, 30 and a foraminous screen member 31 mounted thereto. Screen member 31 is formed of a mesh material of a size which will allow granular and small particulate matter such as sand or so-called "kitty litter" material to pass therethrough but will retain on its upper surface larger particles of refuse such as feces or clumped urine as shown in FIG. 4. In practice, sifting device 14 is seated within base portion 12 such that screen member 31 is covered with an abundance of absorbent litter material 32.

The assembly 10, as shown in FIGS. 1 and 3, is then located in a convenient home location for ready access by the family cat (or like sized house pet) when the animal senses nature is calling.

After use and before accumulation of waste is sufficient to cause family members to gag, the assembly 10 is periodically cleaned in the manner to be now described. Sifting device 14 is removed from the base portion 12 of assembly 10, as shown in FIG. 4, by lifting device 14 from beneath litter material 32 which allows unclumped granular litter 32 to pass therethrough back into base portion 12 while holding the lumpy waste upon foraminous screen 31 of device 14. The waste material is immediately disposed of in a conventional manner and assembly 10 is restored for use in the following fashion.

Housing 11 is rotated from its operational position on bottom member 15 to a seated position on wall portion 23 as shown in FIG. 5 whereupon the litter material 32, which remained in base portion 12 after sifting device 14 was lifted therefrom, flows in response to gravitational forces, into litter receiving wing portion 13 in an orderly and non-disruptive fashion. Once the flow of the litter material 32 has ceased, housing 11 is further rotated to a second seated position on wall portion 24 as shown in FIG. 6 which causes any litter material 32 remaining in base portion 12 to be completely transferred into wing portion 13 and leave base portion 12 completely free of litter material 32. Roof portion 25 serves as a detent and operatively retains litter material 32 within wing portion 13 as shown in FIG. 6. Note, the preferred embodiment of housing 11 is completely stable as a free-standing entity when placed on either of the wing portion walls 23 or 24.

At this point, the housing 11 is rotated back onto end wall 23 (the so-called "second position") from its previous position on end wall 24 (the so-called "third position") and sifting device 14 can be readily inserted into the now-empty base portion 12 as shown in FIG. 7. Sifting device 14 is placed in housing 11 until screen member 31 is in surface-to-surface engagement with bottom member 15 of base portion 12 and assembly 10 is restored.

Assembly 10 is then rotated back into its original operative position, that is, from being seated on wall 23, to being seated on bottom member 15 of base portion 12, in the manner suggested in FIG. 8, whereupon the angle of repose of litter material 32 which had been transported into wing portion 13 is exceeded and the material 32 flows back into base portion 12 where it overlays and covers screen member 31 of sifting device 14. At this point, assembly 10 is preferably shaken gently to enforce the uniformity of the distribution of litter material 32 in base portion 12 to cover the entire screen member 31 and assembly 10 is again placed in operative location for further use.

In an optional practice of the present invention as shown in FIGS. 9–12 a suitable hood structure 35 may be readily attached to assembly 10 as by placing it directly on roof 25 and walls 16, 17, and 18, of assembly 10. In practice, hood structure 35 is preferably made of an injection molded plastic (as are the members of assembly 10) and comprises a top wall 37, a first side wall 38, a second side wall 39 and a front wall 40 integrally formed together. Front wall 40 will have a suitable opening 41 defined therein to permit ready ingress and egress for the pet into the rest area. Preferably, each of the walls 37, 38 39 and 40 of hood structure 35 has a lip or other structure adapted to simply yet reliably engage with the walls of assembly 10 when hood structure 35 is operably placed thereon. Exemplary lips are shown best in FIG. 10 and are identified as lips 42 and 43 on side walls 38 and 39, respectively.

From the foregoing, it is readily apparent that a new and useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A litter box assembly comprising: a housing and a removable sifting device, said housing including a base portion and a wing portion; said base portion having a rectangular bottom member which has a first side edge, a second side edge, a first end edge, and a second end edge, said base portion further having a first side wall, a second side wall, and an end wall, each of said side walls being attached to and extending perpendicularly upwardly one each from each of said side edges, and said end wall extending perpendicularly upwardly from said first end edge; said wing portion having a first angularly disposed end wall having a first side edge, a second side edge, a top edge, and a bottom edge, said bottom edge of said first angularly disposed end wall being attached to said second end edge of said bottom member of said base portion to define therebetween an interior angle of about 120°, a second angularly disposed end wall having a first side edge, a second side edge, an upper edge and a lower edge, said lower edge of said second angularly disposed end wall being attached to said top edge of said first angularly disposed end wall to define therebetween an interior angle of about 120°, said wing portion further having a roof member having a first side edge, a second side edge, a first end edge and a second end edge, said first end edge of said roof member being attached to said upper edge of said second angularly disposed end wall, so that said roof member is disposed in substantially parallel relationship to said rectangular bottom member of said base portion, and said wing portion further having a first and a second pentagonal side wall disposed in spaced generally parallel relationship to each other and attached to and extending coplanar with said side walls of said base portion, each of said pentagonal side walls being attached to the adjacent side edges of said roof member, said first angularly disposed end wall, and said second angularly disposed end wall; and said removable sifting device having a substantially rectangular screen member adapted to be seated in said base portion between said side walls in generally abutting relationship to said bottom member and adapted to receive granular absorbent litter material disposed thereupon; whereby said granular absorbent litter material is movable into said wing portion from said base portion when said litter box assembly is rotated to be seated first on said first angularly disposed end wall and then seated second on said second angularly disposed end wall whereupon said granular absorbent litter material is transferred completely into said wing portion and said bottom member is left completely free of said litter material to facilitate the reinsertion of said removable sifting device into said base portion.

2. A litter box assembly according to claim 1 further comprising a hood structure operably and removably disposed upon said housing; said hood structure having a top wall, a first side wall, a second side wall and a front wall; said front wall having an opening defined therein for ingress and egress.

3. A litter box assembly comprising: a substantially rectangular, open base portion having a bottom seating surface; a litter holding means attached to said base portion at one end thereof; and a removable sifting device having a sifting surface, said sifting device being operatively disposed flat within said base portion such that said sifting surface is in surface-to-surface engagement with said base portion, said litter holding means including a plurality of end walls attached to and disposed at preselected angles relative to each other cumulatively summing to less than 270° to provide at least one alternative seating surface for said litter box assembly, said litter holding means further having a first side wall and a second side wall attached to each of said plurality of end walls such that said first side wall and said second side wall are in spaced generally parallel relationship to each other and define with said plurality of end walls a compartment for temporarily receiving and holding litter therein whereby said litter is movable into said litter holding means from said open base portion when said litter box assembly is rotated to be consecutively seated respectively on each of said plurality of end walls whereupon said litter is transferred completely into said litter holding means from said open base portion and said bottom seating surface is left completely free of litter to facilitate the reinsertion of said sifting device into said base portion.

4. A litter box assembly according to claim 3 further comprising a bed of particulate litter material disposed over and covering said sifting device.

5. A litter box assembly according to claim 3 in which said litter holding means is pentagonal in cross-section and provides a storage volume sufficient to receive and hold therewithin all of the litter temporarily disposed in said litter holding means of said litter box assembly.

6. A litter box assembly according to claim 3 in which said sifting device is substantially rectangular.

7. A litter box assembly according to claim 3 further comprising a hood structure operably and removably disposed upon said base portion; said hood structure having a top wall; a first side wall, a second side wall and a front wall; said front wall having an opening defined therein for ingress and egress.

8. A litter box assembly comprising a base portion, having a bottom member a sifting device removably disposed horizontally flat within said base portion, a granular litter receiving wing portion operably connected to said base portion and granular litter transporting means operatively associated with said granular litter receiving wing portion for readily transporting granular litter material thereinto from said base portion to facilitate the restoration of said sifting device into said base portion, said granular litter transporting means comprising means for supporting said assembly through successive rotations of said litter box assembly containing granular litter material; whereby said successive rotations move said base portion through greater than ninety degrees about said granular litter receiving wing portion to completely transfer said granular litter material into said litter receiving wing portion and completely free the bottom member of said base portion to enable a sifting device to be placed in said base portion.

9. A litter box assembly according to claim 8 further comprising a hood structure operably and removably disposed upon said litter box assembly; said hood structure having a top wall, a first side wall, a second side wall and a front wall; said front wall having an opening defined therein for ingress and egress.

10. A litter box assembly according to claim 8 in which said litter receiving wing portion comprises a first angularly disposed end wall attached to and disposed relative to said base portion of said litter box assembly to define an interior angle of greater than ninety degrees; a second angularly disposed end wall connected to said first angularly disposed end wall; a roof member attached to said second angularly disposed end wall; and a first side wall and a second side wall each of which is operatively interposed between and attached to said roof member and said first and second angularly disposed end walls; said first angularly disposed end wall providing a first base upon which said litter box assembly may rest after rotation thereof and said second angularly disposed end wall providing a second base upon which said litter box assembly may rest after further rotation of said litter box assembly.

* * * * *